United States Patent [19]
Lake et al.

[11] Patent Number: 5,900,679
[45] Date of Patent: May 4, 1999

[54] SYSTEM AND APPARATUS FOR CONTROLLING REAR INDICATOR LIGHTS ON A VEHICLE

[75] Inventors: Robert Lake, Wakefield; William E. Sheehan, Melrose, both of Mass.

[73] Assignee: Maximum Products Inc., Wakefield, Mass.

[21] Appl. No.: 09/096,043

[22] Filed: Jun. 11, 1998

Related U.S. Application Data

[63] Continuation of application No. 08/707,105, Sep. 3, 1996, Pat. No. 5,767,589.

[51] Int. Cl.$^6$ ........................................................ B60Q 1/26
[52] U.S. Cl. ........................... 307/10.8; 315/77; 340/469; 340/475; 340/479
[58] Field of Search ................................... 307/10.8, 9.1, 307/10.1; 315/77; 340/463, 465, 468, 469, 475, 479

[56] References Cited

U.S. PATENT DOCUMENTS

| | | | |
|---|---|---|---|
| 2,897,479 | 7/1959 | Keegin | 340/475 |
| 4,682,146 | 7/1987 | Friedman, III | 340/468 |
| 5,498,910 | 3/1996 | Hopkins et al. | 307/10.8 |
| 5,536,975 | 7/1996 | Jennings | 307/10.8 |
| 5,767,589 | 6/1998 | Lake et al. | 307/10.8 |

OTHER PUBLICATIONS

"Brake Light Signal Module" Catalog entry, *Signal Dynamics Corp.*, Fort Lauderdale, FL, http://www.signaldynamics.com/blsm.htm, no date.

"Product Review, Brake Light Signal Module" *American Iron Magazine* http://www.signaldynamics.com/prai.htm, Feb. 1995.

*Primary Examiner*—Richard T. Elms
*Attorney, Agent, or Firm*—David D. Lowry; David S. Resnick

[57] ABSTRACT

According to the present invention, a lighting control circuit is provided in which various logic gates, transistors and other smaller-scale circuit elements are combined. The circuit receives as inputs the control signals from the vehicle, including the left and right indicator signals, the brake signal and the tail light signal. Each of these signals is fed into a first bank of logic gates whose outputs are supplied to a second bank of logic gates, whose output is in turn supplied to two transistors, each connected to a separate single filament bulb, one for the left side of the vehicle and the other for the right side.

15 Claims, 6 Drawing Sheets

SYSTEM AND APPARATUS FOR CONTROLLING REAR INDICATOR LIGHTS ON A VEHICLE

The present application is a continuation of application Ser. No. 08/707,105 filed Sep. 3,1996, now U.S. Pat. No. 5,767,589.

FIELD OF THE INVENTION

The present invention relates to brake lights, tail lights and indicator lights for a vehicle. More particularly, the invention relates to a control circuit for controlling such lights.

BACKGROUND OF THE INVENTION

A vehicle such as a motorcycle, an automobile or a truck uses a plurality of lights mounted externally on the vehicle to indicate certain information about the vehicle to other drivers and pedestrians. Typically, such lights are mounted on the rear end of the vehicle on both left and right sides of the vehicle's rear end.

A brake light is used to inform others that the driver has applied the brake and is thus beginning to slow down the vehicle. A tail light is used at night to indicate the presence of the vehicle to others. Indicator lights are used to inform others that the driver has signalled his/her intention to turn the vehicle either left or right, depending on which indicator light is turned on.

In the prior art, separate single filament lighting bulbs were used for all three of these functions. Alternatively, the brake and tail light functions were combined in a single two-filament bulb, with one filament dedicated to the brake light function and the other filament dedicated to the tail light function. Each filament requires a separate wire to energize the filament. Therefore, for the prior art systems mentioned above a total of six wires is required to energize the lighting system.

This leads to a complicated wiring scheme involving many wires. The more wires involved, the higher the chance that a wire defect will occur. Also, the connection of the lighting system is made more complicated by an increased number of wires. The more wires involved, the more space for laying wiring must be provided. In smaller vehicles such as a motorcycle, such space is critical. Further, with a motorcycle, drivers often like to custom design their vehicle, and thus a complicated wiring system involving many wires makes designing the vehicle quite difficult.

Another problem with the above-mentioned prior art is that with the first prior art version, many bulbs are required (two for each lighting function, since both the left and right sides must be accounted for). This makes it difficult to reduce the size of the overall lighting package, a goal which is especially important in smaller vehicles such as motorcycles.

For the second prior art version, although less overall bulbs are required, complex double filament bulbs must be used. This makes production of the lighting assembly more expensive. Also, this version still requires four bulbs total, and thus also suffers from the problem mentioned above for the first version, although to a lesser extent.

U.S. Pat. No. 5,241,241 discloses a circuit for driving a single bulb (for each of right and left sides) used for both brake and indicator operations. However, this arrangement requires that a separate bulb be provided for the tail light for each side of the vehicle.

SUMMARY OF THE INVENTION

The present invention provides a lighting system for a vehicle which solves the above problems noted in the prior art. The total number of wires required is reduced, the wiring system simplified, the number of bulbs is reduced as well as the complexity of such bulbs.

According to the present invention, a lighting control circuit is provided in which various logic gates, transistors and other smaller-scale circuit elements are combined. The circuit receives as inputs the control signals from the vehicle, including the left and right indicator signals, the brake signal and the tail light signal. Each of these signals is fed into a first bank of logic gates whose outputs are supplied to a second bank of logic gates, whose output is in turn supplied to two transistors, each connected to a separate single filament bulb, one for the left side of the vehicle and the other for the right side.

The details of this circuit will be described below in conjunction with the following Figures.

BRIEF DESCRIPTION OF THE DRAWINGS

FIG. 1 shows a lighting control circuit according to one embodiment of the present invention;

FIG. 2 shows another embodiment of the lighting control circuit of the present invention;

FIG. 3 shows another embodiment of the lighting control circuit of the present invention;

FIG. 4 shows another embodiment of the lighting control circuit of the present invention;

FIG. 5 shows yet another embodiment of the lighting control circuit of the present invention; and FIG. 6 shows yet another embodiment of the lighting control circuit of the present invention.

DETAILED DESCRIPTION OF THE PREFERRED EMBODIMENTS

The circuit of FIG. 1 will now be described in conjunction with one embodiment of the present invention.

A voltage value VIN is applied to terminal 11 from the vehicle's battery. For example, if the vehicle is an automobile, VIN will be approximately 12-volts DC. The left turn signal L, the right turn signal R, the brake signal B and the tail light signal T are applied to input terminals 12, 14, 13 and 15, respectively. The vehicle's common ground is applied to terminal 16.

VIN is applied, along line 17 (through several intermediate circuit elements as shown), to the Sources of two p-channel field effect transistors 18 and 19 to provide power for the two transistors. The left turn signal L is applied to one input of an exclusive-OR (XOR) gate 19. The brake signal B is applied to the other input of XOR gate 19 and to an input of another XOR gate 20. The right turn signal R is applied to another input of XOR gate 20. The tail light signal T is applied as an input to a third XOR gate 21, which has another input connected to 12-volts DC.

The output of XOR gate 19 is provided as an input to NOR gate 22. The output of XOR gate 20 is provided as an input to NOR gate 23. The outputs of NOR gates 22 and 23 are provided to the gates G of FET transistors 18 and 19, respectively.

The output of XOR gate 21 is provided to a gated oscillator circuit 24, of a well known construction. For example, gated oscillator circuit 24 is made up of NOR gates 241 and 242 as well the illustrated diodes D3 and D2, resistors R5 and R6 and capacitor C3. It is well known that the values of these components can be adjusted, or some of them removed entirely, to attain a desired duty cycle. Any oscillating circuit can be used with the present invention, not just a gated oscillator circuit. The output of gated oscillator circuit 24 is provided as a common input to NOR gates 22 and 23.

Figure 1:
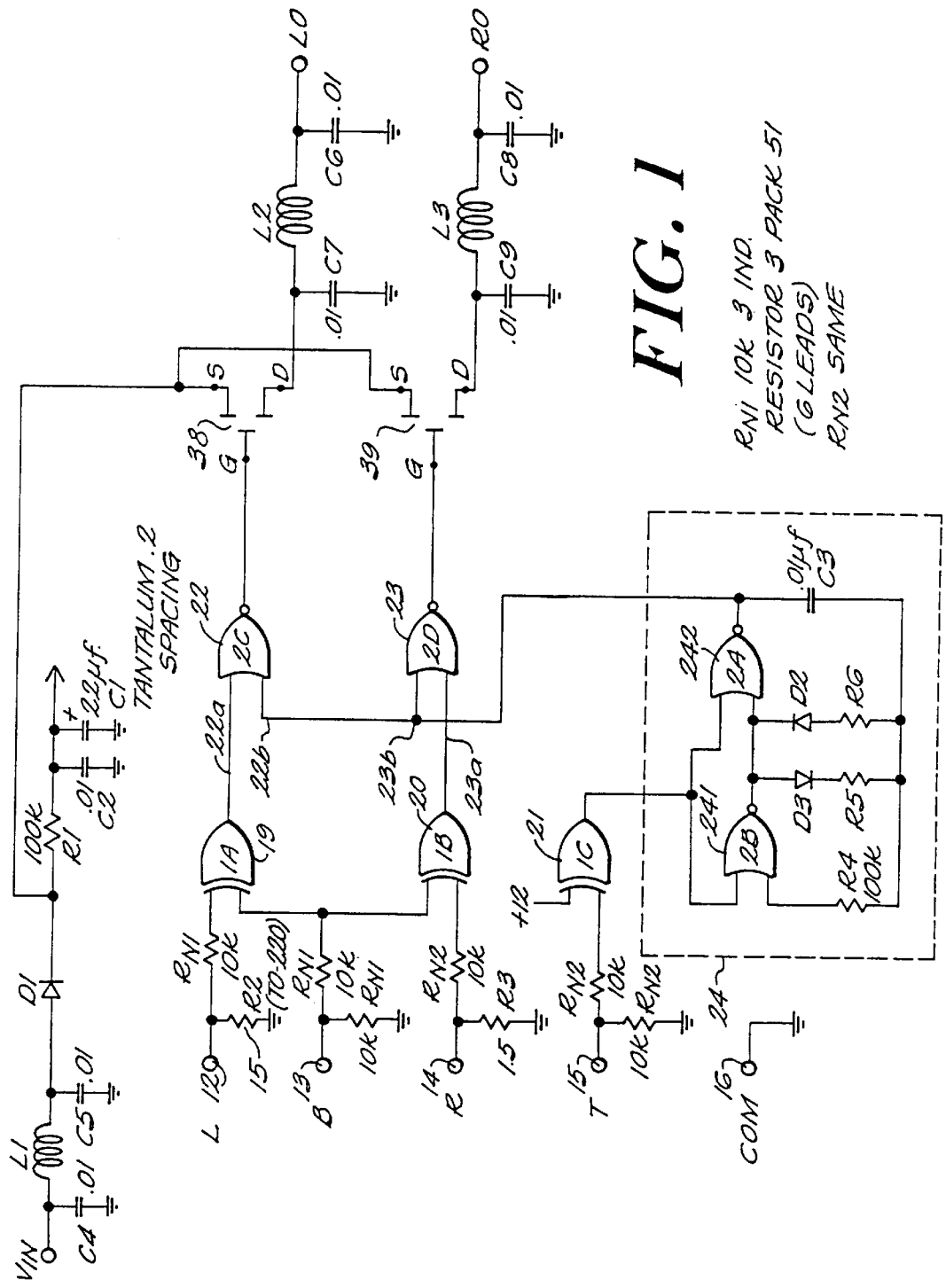

Finally, the drains D of transistors 18 and 19 are connected (through various circuit elements as illustrated) to two single filament bulbs (not shown) on output lines Lo and Ro, respectively. Therefore, the circuit of FIG. 1 is connected to only two single filament bulbs. One bulb (connected at output line Lo) corresponds to the functions for the left rear side of the vehicle while the other bulb (connected at output line Ro) corresponds to the functions for the right rear side of the vehicle. These bulbs can be, for example, halogen lamps. This greatly reduces the overall size and wiring complexity of the lighting assembly.

The operation of this circuit will now be described.

When the L signal is applied to terminal 12, indicating that the driver wishes to make a left-hand turn, and the B signal at terminal 13 is LOW, indicating that the driver is not applying the brake, and the T signal is LOW indicating that the driver is not turning on the tail light, then XOR 19 provides a HIGH output (since it has HIGH and LOW inputs). This HIGH output causes NOR gate 22 to issue a LOW output, since there is a LOW input connected to input 22b (since the gated oscillation circuit 24 is OFF due to the absence of the T signal. When NOR gate 22 issues a LOW signal, the gate G of transistor 18 receives this LOW signal and turns ON (since transistor 18 is a p-type transistor). The ON transistor 18 causes the HIGH signal from VIN to pass through transistor 18 from Source to Drain thus turning ON the single filament bulb connected to output Lo. The bulb will blink ON and OFF since input signal L applied to terminal 12 turns ON and OFF periodically.

When the R signal is activated and applied to terminal 14, indicating that the driver wishes to make a right-hand turn, and the B signal at terminal 13 is LOW, indicating the driver is not applying the brake, and the T signal is LOW indicating that the driver is not turning ON the tail light, then XOR 20 provides a HIGH output (since it has HIGH and LOW inputs). This HIGH output causes NOR gate 23 to issue a LOW output, since there is a LOW input connected to input 23b (since the gated oscillation circuit 24 is off due to the absence of the T signal). When NOR gate 23 issues a LOW signal, the gate G of transistor 19 receives this LOW signal and turns ON (since transistor 19 is a p-type transistor). The ON transistor 19 causes the HIGH signal from VIN to pass through transistor 19 from Source to Drain thus turning ON the single filament bulb connected to output Ro. The bulb will blink ON and OFF since input signal R applied to terminal 14 turns ON and OFF periodically.

If the B signal on terminal 13 is applied while the T signal on terminal 15 is LOW and the L and R signals are non-activated (always LOW), the same operation as described above in the preceding two paragraphs will occur and the single filament bulbs connected to Lo and Ro output terminals will be ON. The bulbs will be ON in a steady fashion, instead of blinking as in the above-described operations, because the B signal is steady HIGH instead of blinking (HIGH/LOW) as the L and R signals do.

If the T signal is HIGH while the B, L and R signals are non-activated (always LOW), then the output of XOR gate 21 is LOW, since it has two HIGH inputs connected thereto. This causes the gated oscillator circuit 24 to oscillate with a duty cycle determined by the value of the diodes, resistors and capacitors making up the circuit 24. Applicant has found that a duty cycle of 80 to 100 Hz provides satisfactory results. This oscillating signal is supplied to inputs 22b and 23b of NOR gates 22 and 23, respectively, thus applying an oscillating HIGH/LOW signal to the outputs of NOR gates 22 and 23 (with a duty cycle equal to the duty cycle provided by gated oscillator circuit 24). This oscillating HIGH/LOW signal opens and closes gates G of transistors 18 and 19 thus passing the oscillating signal to the bulbs connected to outputs Lo and Ro.

In the case described above, the duty cycle of the oscillating circuit 24 is set to a high enough frequency (e.g., 80–100 Hz) that it appears to the human eye that the bulbs are continually ON. However, because of the oscillation, the intensity of the bulbs does not reach its full (rated) amplitude that it would reach, for example, when the B signal is HIGH (indicating that the brake has been applied). For example, the T signal causes the bulbs to be at about one-half the full intensity. In this way, the human eye can perceive a difference between the light bulb state when the brake signal is applied and the light bulb state when the tail light signal is applied.

Thus, the tail light function is accomplished by duty cycling the current to both bulbs, such that the average current integrated over time provides about half the light intensity from the lamp as that provided when the lamp is fully driven at its rated current. Since the duty cycle can be adjusted, the lamp intensity could be increased or decreased as required.

Now, the hybrid operations will be described, where more than one input signal is HIGH at the same time.

If the B signal is HIGH while an indicator (L will be taken in this example) is active, and the T signal is LOW, the output of gate 19 will blink HIGH/LOW since the L signal inherently blinks HIGH/LOW as described above. This will cause the output of gate 22 to also blink HIGH/LOW because the oscillation circuit 24 is OFF (because the T signal is LOW). This will cause the gate G of transistor 18 to turn ON/OFF with the frequency of the L signal and thus cause the bulb connected at Lo to blink ON/OFF from full intensity to zero intensity. Meanwhile, the bulb connected to Ro will be at constant full intensity, since the B signal is HIGH and R is always LOW (and thus XOR 20's output is HIGH and NOR 23's output is LOW, since 23b is LOW and 23a is HIGH). Therefore, the control circuit of FIG. 1 will allow the two single filament bulbs to be used when both the B and the (L or R) signals are HIGH.

If the B and T signals are both HIGH, and both L and R are non-activated (always LOW), then the B signal will override the T signal because of the operation of the XOR and NOR gates. That is, if B is HIGH and both L and R are LOW, the outputs of XOR gates 19 and 20 will be HIGH and thus the outputs of both NOR gates 22 and 23 will always be LOW regardless of the output of oscillator circuit 24. Thus, in this case, both bulbs will be ON at full intensity, due to the B signal.

If B is LOW and T is HIGH and one of (L or R) is active (L will be taken in this example), then the output of XOR 19 will be HIGH (in a blinking mode). Since T is HIGH, oscillating circuit 24 is ON and the oscillating signal is applied to NOR gates 22 and 23 on terminals 22b and 23b, respectively. Because the oscillating signal on input 22b is oscillating at a high frequency (much faster than the L signal is blinking) NOR gate 22 will be provided with a HIGH input at terminal 22a and a LOW input at terminal 22b during most of the time that signal L is HIGH. With this combination of inputs applied thereto, NOR gate 22 will provide a LOW output to G of transistor 18 turning it ON and thus turning on the bulb at Lo.

In the latter case, when L is HIGH, a full intensity signal will be provided to the bulb at Lo. When L is LOW, the reduced intensity signal caused by the oscillation circuit 24 will be supplied to the bulb at Lo, because the output of gate 19 is LOW (it has two LOWs applied as inputs), and gate 22 has a LOW applied at terminal 22a and an oscillating HIGH/LOW signal (with a very high frequency) at terminal 22b. This will cause the light bulb at Lo to be ON at reduced intensity because of the T signal and to blink because of the L signal.

If the B signal is HIGH, the T signal is HIGH and one of the (L or R) is active (L will be taken in this example), the output of XOR 19 is LOW when the L signal is HIGH. Because T is HIGH, circuit 24 is ON and the oscillating signal is applied to 22b and 23b. When L is HIGH (and the output of 19 is LOW), the bulb at Lo goes OFF (because G is HIGH), because the output of circuit 24 is usually LOW when ON. When L is LOW (and the output of 19 is HIGH) G is OFF and the bulb goes ON. Thus, the circuit still works even when all three input signals are active.

Figure 2:
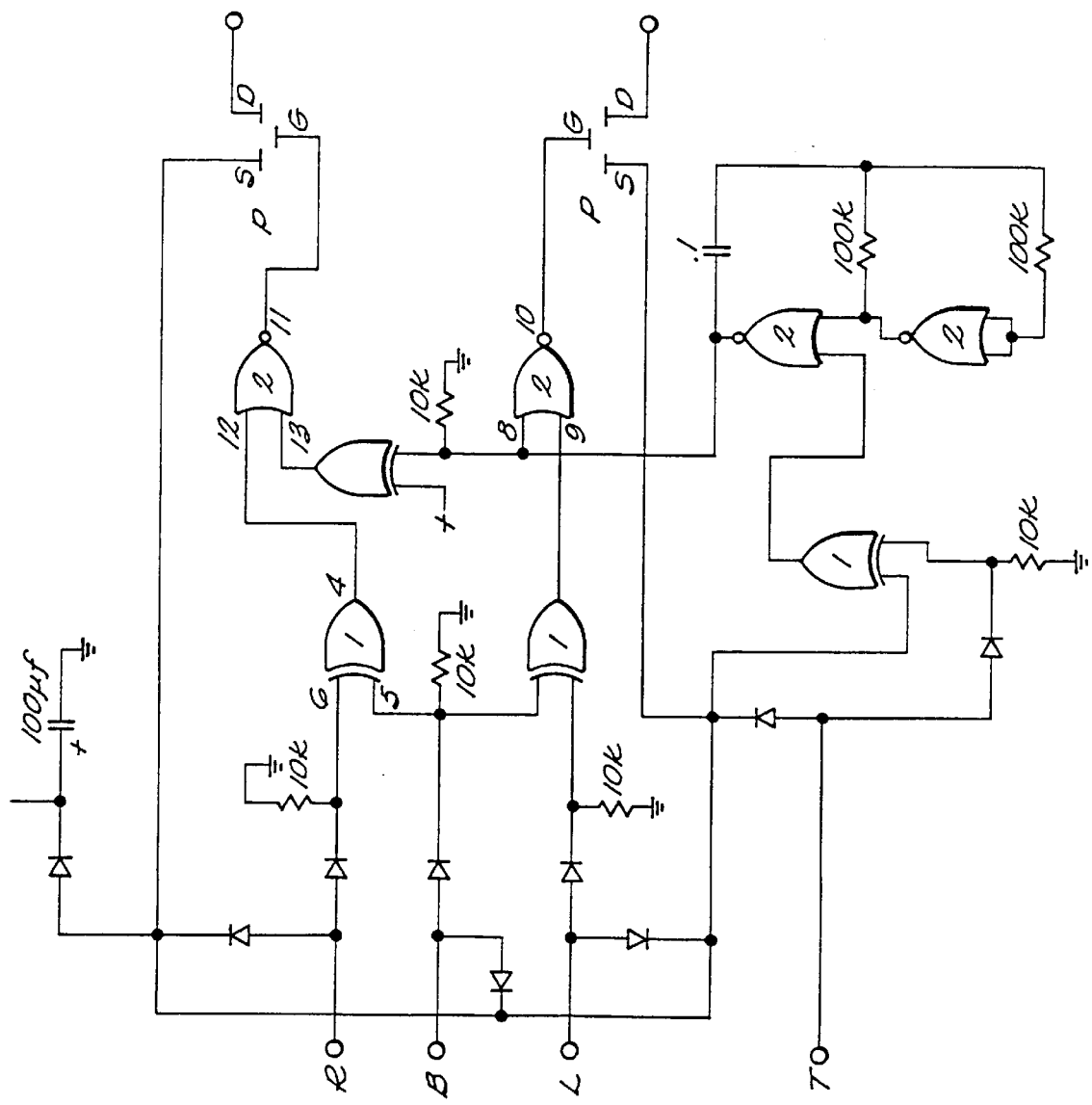

Another embodiment of the control circuit, as shown in FIG. 2, does not have a separate input for the VIN power supply. Instead, the voltage signal is derived on the same lines as the input control signals T, L, B and R. Isolation rectifiers are used, as shown. The gated oscillator circuit and the XOR and NOR circuits are the same as in the first embodiment.

Figure 3:
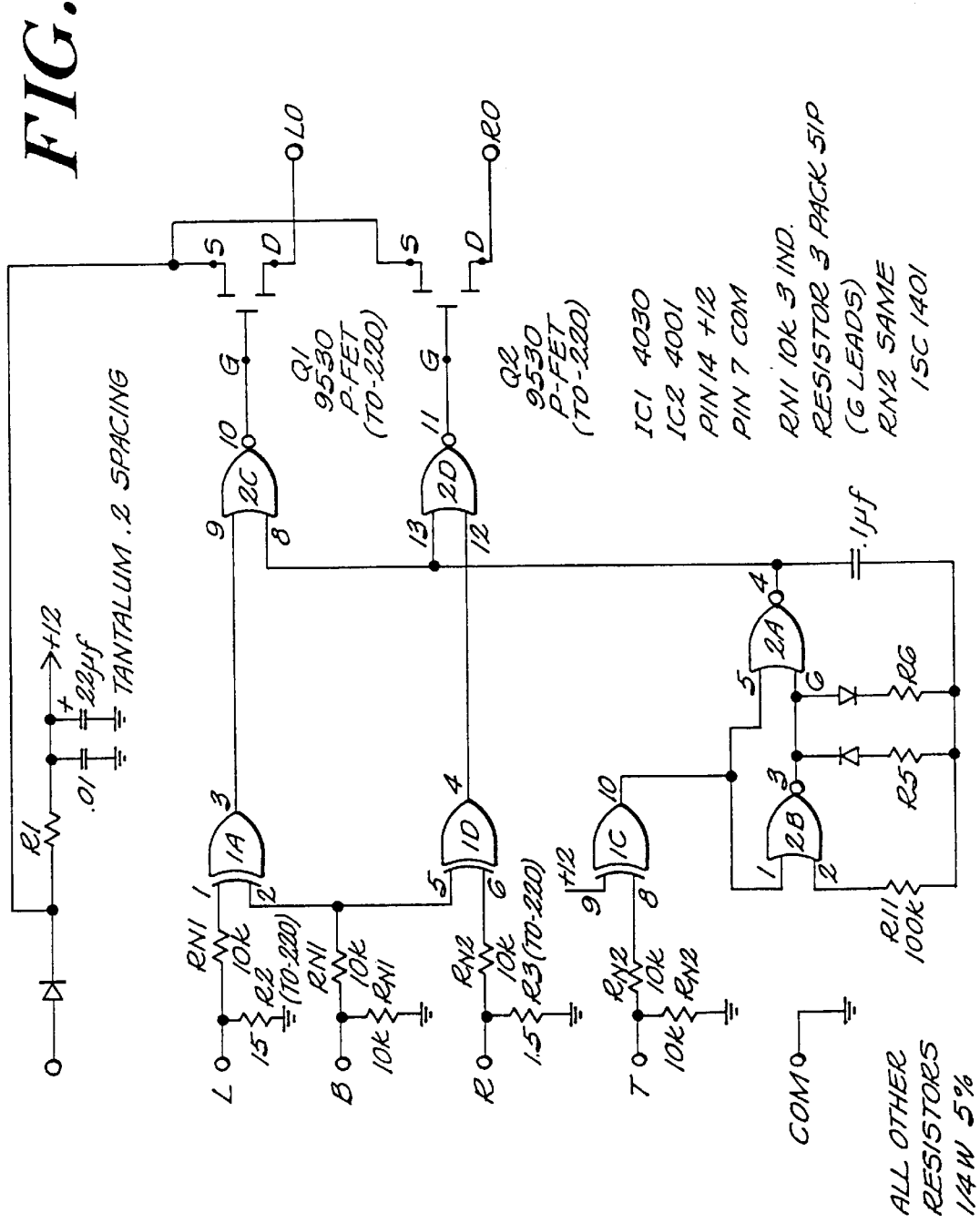

Another embodiment of the control circuit, as shown in FIG. 3, includes a very similar circuit to FIG. 1, with certain circuit elements (besides the logic gates and transistors) either added or removed.

An alternative embodiment includes the flasher timer for creating the blinking indicator signals L and R inside the control circuit itself.

Another alternative embodiment uses N-channel FETs (Field Effect Transistors) with charge pump gate biasing in a high side lamp drive circuit, in place of the P-channel FETs. Or, N-channel FETs could be used in a low side lamp drive circuit in cases where both ends of the lamp filament are accessible.

Figure 4:
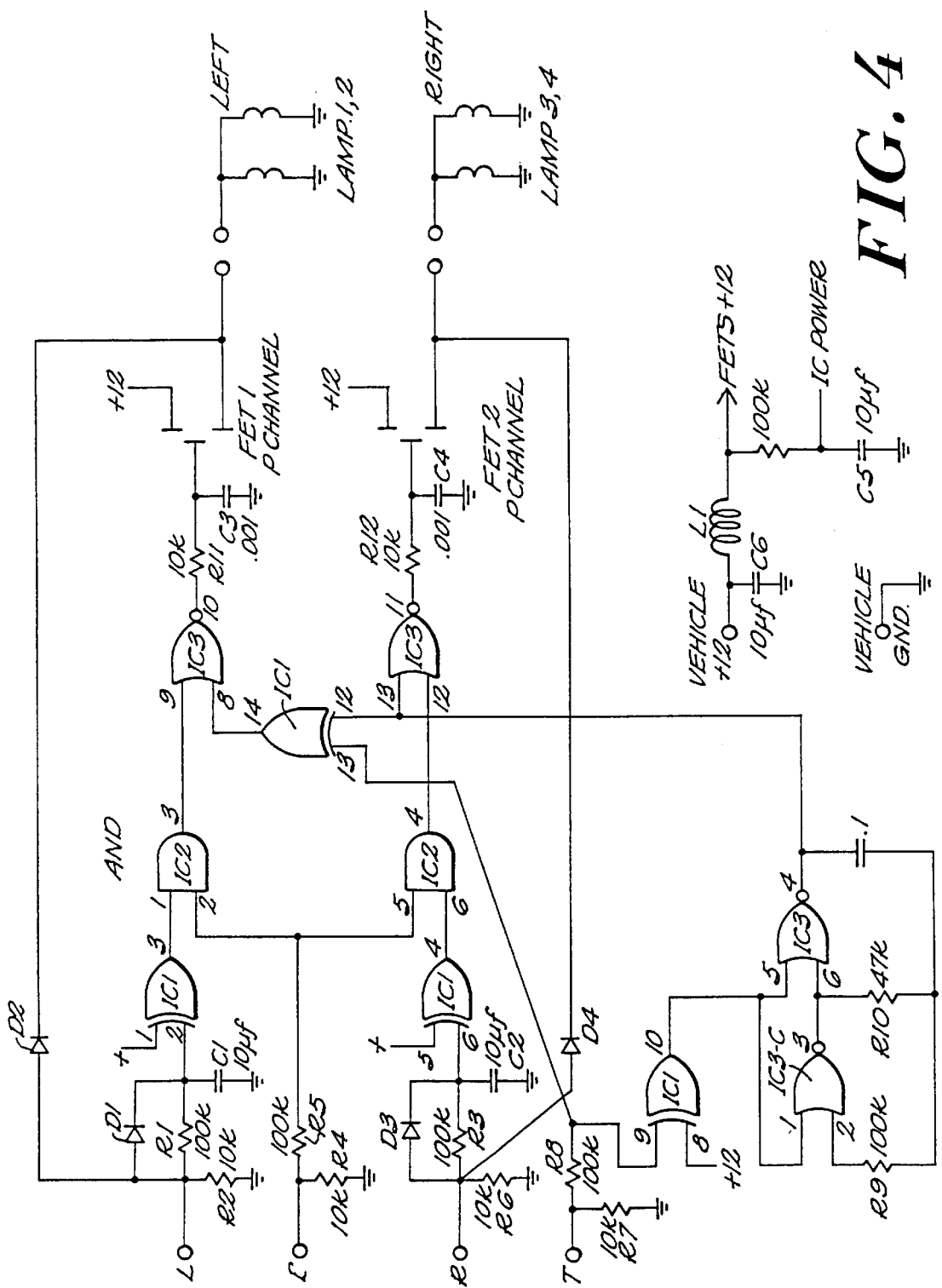

Another embodiment shown in FIG. 4 addresses a situation where a vehicle flasher circuit is capable of detecting a burnt out lamp. In such systems, if a lamp is burnt out, the flasher will go on and stay on to indicate a problem. The circuit shown in FIG. 4 allows the present invention to function properly with such a vehicle flasher circuit. When all inputs (Left, Right, Brake and Tail) are off, all inputs are at 0 volts (logic 0) because of the 10K pull down resistors on each input. Therefore IC1 pin 2 and IC1, pin 6 are low and IC1 pins 3 and 4 are high. However, since IC2 pin 2 and IC2 pin 5 are low, the outputs of these AND gates IC2 pin 3 and IC2 pin 4, are low. IC1 pin 9 is low, therefore IC1 pin 10 is high. This gates off the Tail lamp duty cycle oscillator so IC3 pin 4 is low. With IC1 pin 13 and IC1 pin 12 low, IC1 pin 11 is also low. Thus the outputs of the two NOR gates IC3 pin 10 and IC3 pin 11 are high since all the inputs are low. The output drivers, Power FETS 1 and 2 are off and the lamps are not lit.

Now suppose the left Turn signal comes on, flashing on, off, on, off, etc at about a ½ second to one second rate. Since Pins 2 and 5 of IC2 are still low (the Brake signal is not on), the drive to the Power FET transistor remains off. However, the left turn signal power by-passes this circuitry through Rectifier D2 and goes directly to the left turn signal lamps, thus flashing the lamp on, off, on, off, etc. Should the lamp(s) be open (burnt out) then the vehicle flasher "sees" this and remains not flashing, in the "on" position, indicating to the operator that a lamp is out. The right turn signal circuit operates in an identical manner.

When the Brake signal goes on, pins 2 and 5 of the AND gates go high (Pins 1 and 6 are already high if neither turn signal is on), thus the outputs of the AND gates are high. These outputs go to pins 9 and 12 of IC3, NOR gates. If any input to a NOR gate is high, the output is low. These drive the gates of the power FETS low; since these are P-channel FETS they are driven full on and provide full power to the lamps.

If, while the brake signal is on, either of the turn signals is activated, the following happens: For the left signal pin 2 of IC1 goes high, pin 3 goes low. The AND gate is not satisfied, thus pin 3 of IC2 goes low. Pin 8 of IC3 is low (the Tail lamp circuit is not on). Since both inputs to the NOR gate are low, the output IC3 pin 10 is high and Power FET 1 goes off and no longer drives the Left lamp. However, because of rectifier D2, lamp power is provided directly from the vehicle flasher circuit, and the left lamp stays on for the duration of the left flasher "on" signal. Now, when the Left flasher signal from the vehicle flasher goes off in the normal on-off-on-off cycle the input to pin 2 of IC1 remains high because C1 was charged through D1 to the vehicle battery voltage. When the light flasher signal goes off (in the on-off-on-off cycle) C1 starts to discharge through R2. The R2-C1 time constant is designed to be longer than the off portion of the vehicle flasher on-off-on-off cycle, thus pin 2 of IC1 remains in the logic 1 (high) state, and this time constant is renewed every time the flasher signal goes "on". (The D1-C1 time constant is much shorter than the R1-C1 time constant). Pin 3 remains low during both the on and off cycle of the vehicle flasher, therefore the AND gate is not satisfied, its output remains low, the output of the NOR gate remains high and the Power FET remains "off". During the "off" cycle of the vehicle flasher, no power is supplied to the Left input from the vehicle flasher, so the left lamp goes out. Thus, the left lamp flashes at the vehicle flasher rate, while the right lamp remains steadily lit in the "Brake" mode. Action for the Right side is identical to that for the Left side. In the "four way flasher" mode, both left and right sides will flash at the vehicle flasher rate, irrespective of whether the brake signal is on or off. When the turn signal is cancelled, the Brake light (if the brake signal is on) will come back after a short delay caused by the R1-C1 time constant.

The Tail lamp circuit is similar to that given in FIG. 3. A duty cycle oscillator composed of two NOR gates from IC3, generates about 80 Hz square wave when enabled. When the Tail lamps input is off (low, logic 0) IC1 pin 10 is high, inhibiting the NOR gate oscillator. When the Tail lamp input goes high, IC1 pin 10 goes low, enabling the oscillator which then runs at the 80 Hz rate. This square wave is applied to IC3 pin 13 and IC1 pin 12. With the Tail lamp input high IC1 pin 13 is high, thus that section of IC1 now acts as an inverter. The inverted square wave from IC1 pin 11 is applied to IC3 pin 8. The Power FETS are consequently driven in phase opposition, i.e. FET1 is on, FET2 is off; FET1 is off, FET2 is on. This drives the Left and Right Lamps on and off at the 80 Hz rate, too fast for the eye to see any flicker; the eye integrates the rapidly flashing lamp light thus the lamp appears steadily on but at a reduced brightness; the thermal time constant of the lamps also acts to reduce the brightness.

The advantage of driving the Left and Right lamps in phase opposition is that the peak current supplied from the +12 bus is one half of that, which would be supplied if both left and Right lamps were driven on and off together, although the average current is the same. Also since the Left lamp receives power at the instant the Right lamp is shut off, and vice versa, the supplied current to the FET pair from the +12 volt bus is continuous, greatly reducing the RFI and EMI generated. A hash filter inductor, L1, in the +12 volt supply line in the module, filters the switching spikes that are generated, further reducing the conducted RFI in the vehicle's 12 volt bus.

The remaining source of radiated and conducted electrical noise is the pulsating currents in the Left and Right lamps and wiring when the Tail lamps are on. This noise can be reduced by slowing the rate of change (dv/dt) of the rising and trailing edges of the current wave form to the lamps. This is accomplished by the RC filters in the FET gate inputs, which slows the edges at the expense of slightly increased power dissipation in the FET's.

Figure 5:
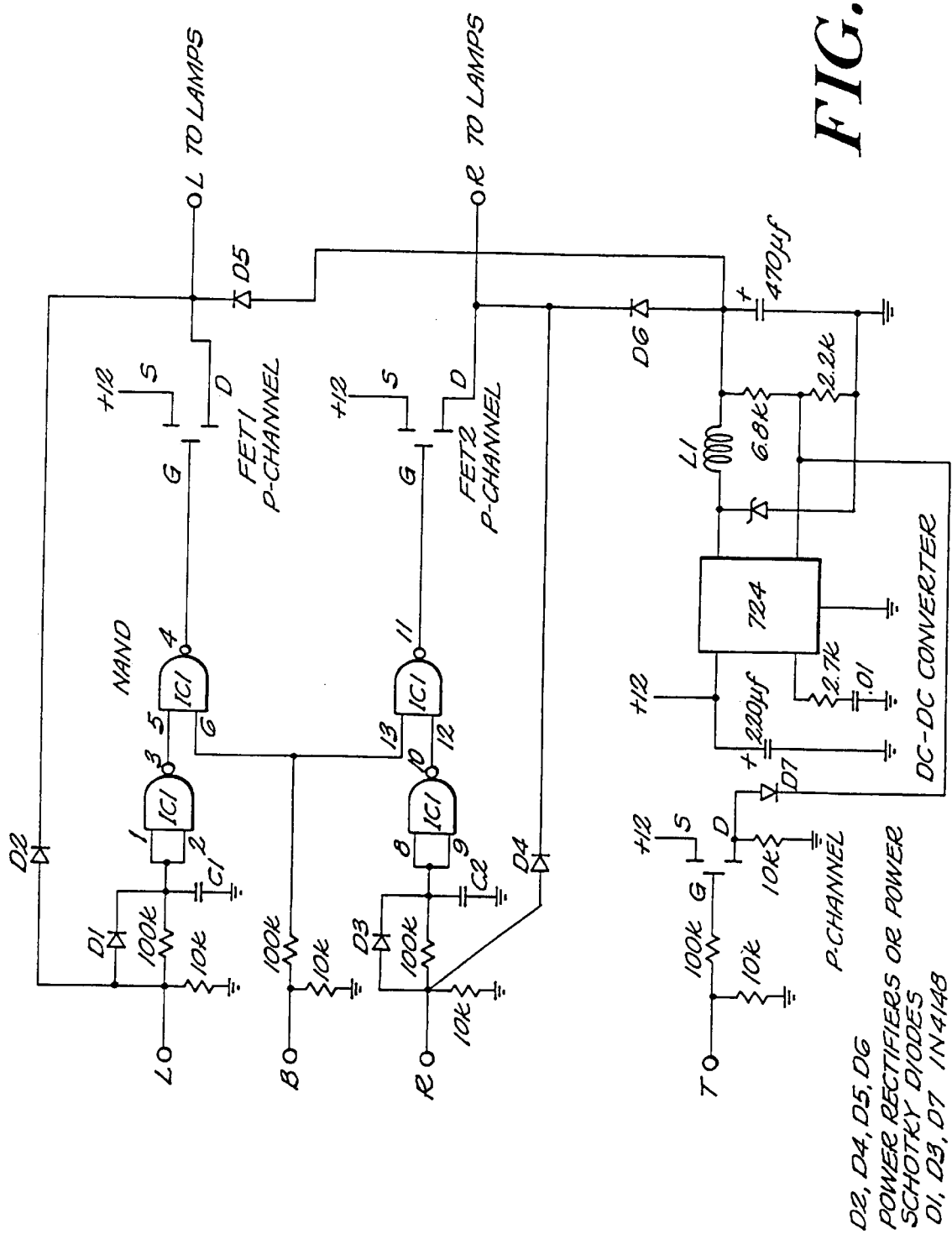

The embodiment shown in FIG. 5 operates in an analogous manner to embodiment shown in FIG. 4. The Left flasher, Right flasher, and Brake function operate in essentially the same manner. However, the Tail Light power is generated differently. A reduced voltage level (approximately 9 or 10 volts) is generated by a power dc to dc converter. When the tail lamp input is off (low), FET3 is on. This provides +12 volts to the feedback input of the dc-dc converter through diode D7, effectively turning it off. When the tail lamp input goes high, FET3 goes OFF, diode D7 is reverse biased, allowing the dc-dc converter to run and generate the required (reduced) voltage. This 9 or 10 volt voltage is applied to the Left and right lamps through isolating diodes D5 and D6. If the Brake lights are turned on through FET1 and FET2, the higher 12 to 14 volts increases the lamps to full brightness; D5 and D6 are reversed biased and the dc-dc converter has no effect. As soon as the brake signal is removed, the dc-dc converter resumes providing the reduced lamp current, thereby reducing the brightness to the desired lower tail lamp intensity.

The flasher signals operate in the same way, bypassing the circuitry through D2 and D4, and overpowering the Tail lamp power, if on.

One difference between this circuit over circuit shown in FIG. 4 is the Tail lamp power to the lamps is steady dc rather than pulsating, reducing the effective power since the thermal time constants of the lamps are not continuously involved, and of course generating no RFI and EMI in the lamp circuits.

Another difference of the dc-dc converter method of FIG. 5 is that the voltage level and thus the lamp brightness can be varied more easily than the circuit in FIG. 4, where duty cycle is around 50%.

Figure 6:
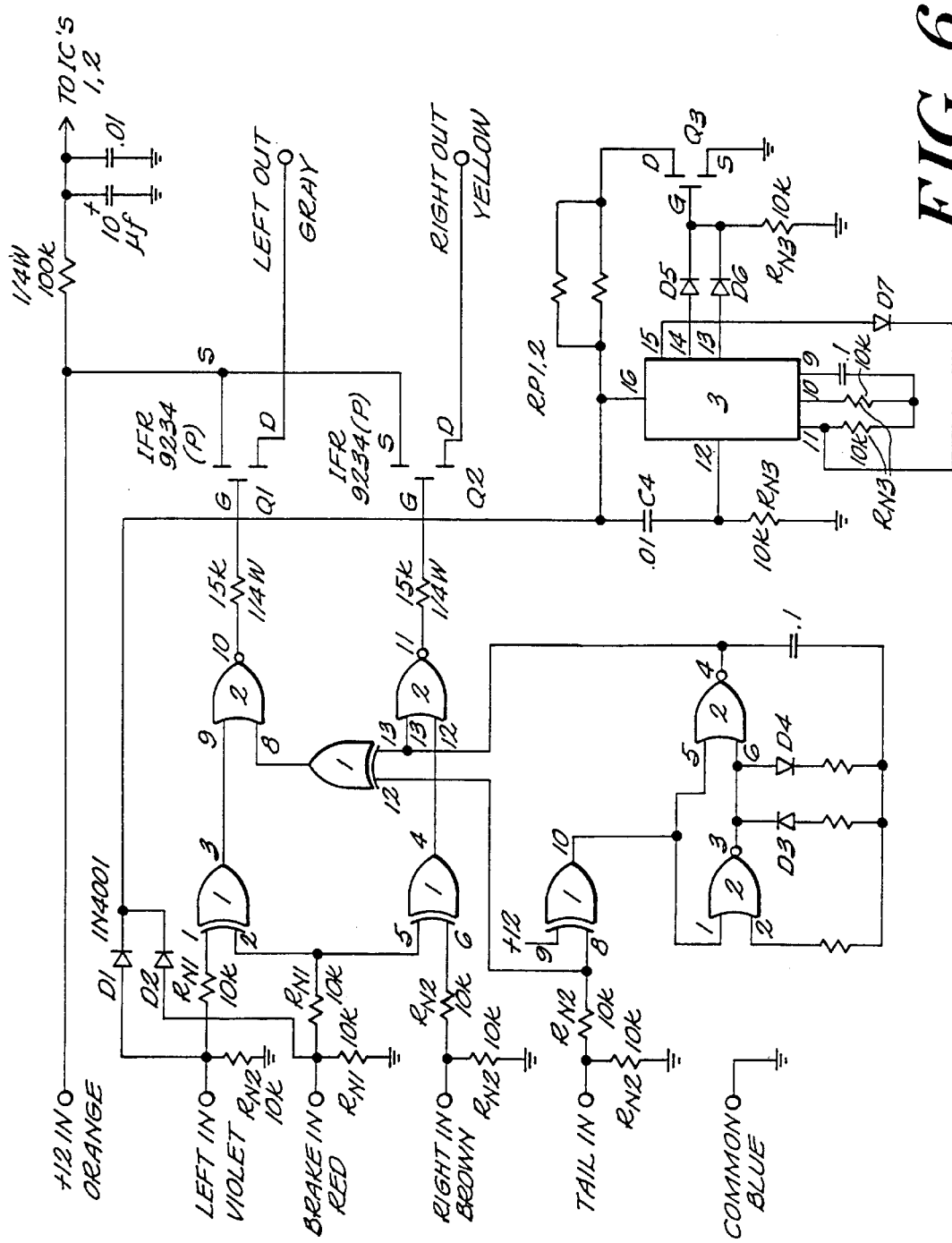

The preferred embodiment of the present invention as shown in FIG. 6 is similar to the circuit of FIG. 3, with the addition of an XOR gate feeding Pin 8 of IC2 to invert the tail light drive to left lamp drive circuit so as to alternate the tail light drive signals to the left and right lamps. This drives the lamps in phase opposition as described previously. In addition, on the circuit of FIG. 6, there is added an additional circuit, IC3 and Diodes D1 and D2, RN3, Diodes D5, D6, D7, C3, RP1, RP2, and FET Q3 which provide a pulsed load to the turn signal inputs, left in and right in. The purpose of the pulsed load is to provide the correct resistive load to the output circuit of one or more manufacturers' self-cancelling flasher module. Unless this flasher module "sees" a sufficiently high current load when either or both the left turn signal and right turn signal output is on (providing current), it will not flash. Since the required current load is substantial (several amps), a fixed D.C. load resistor generates considerable heat. However, the self-cancelling flasher module actually requires that the high current load only be present at a certain short interval in the flasher on cycle.

When either the left or right (or both) flasher inputs go high (turn on), this voltage is applied to IC3 through D1 or D2. Capacitor C4 and resistor RN3 differentiate this high-going edge and reset binary counter IC3. A self contained oscillator in IC3 starts running at about a 500 Hz rate. These oscillations are counted in the binary counter and after the proper number of cycles, Pin 14 of IC3 goes high turning on Q3. Q3 "on" in effects ground RP1 and 2, thus putting a low resistance (approximately 3 ohms) load on the self-cancelling flasher module output through D1 or D2. Thus at the proper time in the flasher output cycle, the flasher is loaded by a heavy 4 amp current. When the flasher output subsequently turns off, power is removed from IC3, and the circuit is ready for the next on cycle of the flasher output. In the event that IC3 did not load the flasher output at the right time, the flasher output goes into a steady on (high) state, with a periodic short pulse low going output on a longer cycle than normal. Since IC3 continued to count, the high output appears on D6, turning on Q3 at what is now the correct time; the flasher "sees" the load it requires and steps into the normal flasher mode. Should, for any reason the flasher output stay on (high due to malfunction or component breakdown, IC3 continues to count until the output on Pin 15 is reached which puts a high level through D7 to Pin 11, disabling the oscillator and removing the drive to Q3, thus ensuring that the high current load is removed, preventing RP1 and 2 from overheating and destroying the module. IC3 is automatically reset when power is removed by turning off the flasher or removing primary power.

Another feature of the circuit of FIG. 6 is that it permits any load on the output, from nothing up to 4 amps per side while at the same time satisfying the loading, requirements of the self-cancelling flasher module. It also operates properly with a flasher input from standard "heavy duty" electronic flasher, and will work with the inexpensive thermal flashers provide a sufficient load (as from standard 1156 type bulbs) is present on the front directional lights.

Note that all of the above logic timing and counting functions could easily be implemented using a low cost microcontroller or microprocessor.

While halogen lamps have been mentioned above as the light bulbs, other types of light sources could also be used, such as high intensity LED lamps.

Also, all of the above embodiments could include an additional, brake-only, "third-eye" lamp.

Other alternatives and variations are possible without departing from the sphere and scope of the invention as defined by the claims appended hereto.

What is claimed is:

1. A lighting control apparatus for a vehicle comprising:
   an turn signal input responsive to a turn indicator signal from said vehicle;
   a tail light signal input responsive to a tail light signal from said vehicle;
   an output signal, for providing electric current to a vehicle indicator lamp; wherein a tail light signal alone produces a reduced current output signal; a turn indicator signal without a tail light signal produces an alternating substantially full current/no current output signal; and a turn indicator signal with a tail light signal produces an alternating substantially full current/reduced current output signal.

2. The apparatus of claim 1 further including:

a braking signal input responsive to a braking signal from said vehicle;

wherein a braking signal without a turn indicator signal produces a substantially full current output signal.

3. The apparatus of claim 2 further including:

a second turn signal input accepting a second turn indicator signal; and a second output signal, for providing electric current to a second vehicle indicator lamp;

wherein said second output signal is responsive to said braking signal, said tail light signal, and said second turn indicator signal similar to the response of said output signal.

4. The apparatus of claim 1 wherein said reduced current output signal is approximately half of said substantially full current output signal.

5. The apparatus of claim 1 wherein said reduced current output signal is approximately one-third of said substantially full current output signal.

6. The apparatus of claim 1 wherein said reduced current output signal is produced by alternating substantially full current and no current.

7. The apparatus of claim 6 wherein said alternating of substantially full current and no current is performed at a frequency of greater than 80 hertz.

8. The apparatus of claim 6 wherein said alternating of substantially full current and no current is performed at a frequency of less than 100 hertz.

9. The apparatus of claim 1 wherein said turn signal input provides a resistive load to said turn indicator signal from said vehicle.

10. The apparatus of claim 1 wherein said vehicle is a motorcycle.

11. A rear light signaling system for a vehicle, said vehicle including a braking signal, tail light signal, and a left and right turn indicator signals; said rear light signaling system comprising:

a left indicator lamp;

a right indicator lamp;

wherein said left indicator lamp is responsive to said braking signal, tail light signal and left turn signal as follows:

said left indicator lamp is driven to a partial brightness by a tail light signal; said left indicator lamp is driven to a full brightness by a brake light signal without a left turn indicator signal; said left indicator lamp is driven in alternating full brightness and off by a left turn indicator signal without a tail light signal; and said left indicator lamp is driven to alternating full brightness and partial brightness by a left turn indicator signal with a tail light signal; and wherein said right indicator lamp is responsive to said braking signal, tail light signal and right turn signal in an equivalent fashion to said left indicator lamp.

12. The rear light signaling system of claim 11 wherein said system provides a resistive load to said left and right turn indicator signals from said vehicle.

13. The rear light signaling system of claim 11 wherein said vehicle is a motorcycle.

14. A vehicle including:

two rear indicator lamps, a left and a right;

a left-right turn indicator switch for producing separate left and right turn signals each comprising alternating ON/OFF current;

a braking signal, produced when brakes on said vehicle are activated;

a tail light signal, produced when running lights on said vehicle are activated;

wherein said left rear indicator lamp is responsive to said left turn signal, braking signal, and tail light signal as follows:

said left rear indicator lamp is driven to a partial brightness by a tail light signal; said left rear indicator lamp is driven to a full brightness by a brake light signal without a left turn signal; said left rear indicator lamp is driven in alternating full brightness and off by a left turn signal without a tail light signal; and said left rear indicator lamp is driven to alternating full brightness and partial brightness by a left turn signal with a tail light signal; and wherein said right rear indicator lamp is responsive to said right turn signal, braking signal, and tail light signal in an equivalent fashion to said left rear indicator lamp.

15. The vehicle as claimed in claim 14 wherein said vehicle is a motorcycle.

* * * * *